Dec. 16, 1924.

Re. 15,967

C. L. SEBRING

DRYING RACK FOR POTTERY MANUFACTURE

Original Filed July 22, 1920 3 Sheets-Sheet 1

Inventor:-
Charles L. Sebring.
By his Attorneys:-
Howson & Howson.

Dec. 16, 1924. Re. 15,967

C. L. SEBRING

DRYING RACK FOR POTTERY MANUFACTURE

Original Filed July 22, 1920 3 Sheets-Sheet 2

Inventor:
Charles L. Sebring.
by his Attorneys-
Howson & Howson.

Dec. 16, 1924. Re. 15,967

C. L. SEBRING

DRYING RACK FOR POTTERY MANUFACTURE

Original Filed July 22, 1920 3 Sheets-Sheet 3

Inventor:—
Charles L. Sebring.
by his Attorneys.—
Howson & Howson.

Reissued Dec. 16, 1924. Re. 15,967

UNITED STATES PATENT OFFICE.

CHARLES L. SEBRING, OF SEBRING, OHIO.

DRYING RACK FOR POTTERY MANUFACTURE.

Original application filed July 22, 1920, Serial No. 398,252. Renewed January 19, 1922, Serial No. 530,493. Original No. 1,410,275, dated March 21, 1922. Application for reissue filed March 15, 1924. Serial No. 699,602.

*To all whom it may concern:*

Be it known that I, CHARLES L. SEBRING, a citizen of the United States, residing at Sebring, in the county of Mahoning and State of Ohio, have invented a new and useful Drying Rack for Pottery Manufacture, of which the following is a specification.

This invention relates to drying racks for pottery manufacture and more particularly to a rack upon which the green ware is moved through a drying chamber and around a series of steam pipes or similar heating elements which are located within the drying chamber.

The objects of the invention are the provision of a drying rack for pottery manufacture made in the form of an endless conveyor arranged to carry the green ware through a drying chamber and around a series of heating pipes or the like located in said chamber, the conveyor after carrying the green ware through the drying chamber passing back to a discharge point located near the filling point of the conveyor in order that the jigger operator and his assistant may form the ware and place it upon the conveyor at the filling point and at the same time easily and readily remove the dried ware at the discharge point and form other new ware in the molds from which the dried ware is removed, means being provided whereby the jigger operator may control the intermittent movement of the conveyor as the green ware is placed thereon.

Other objects of the invention are the provision of means whereby the conveyor is moved upwardly past the jigger operator, the shelves upon the conveyor being empty as they approach the jigger opertor who fills each shelf, as it is moved into position, with molds containing green ware, the filled shelves being moved upwardly away from the jigger operator. Thus as the molds containing green ware are placed upon each shelf, any scraps or dirt, which might be dropped upon the shelves below, will not cause any damage as it will be deposited upon the empty shelves.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

A practical embodiment of the invention is disclosed in the accompanying drawings, forming a part of this specification in which similar numerals of reference indicate corresponding parts throughout the several views.

Figure 1:
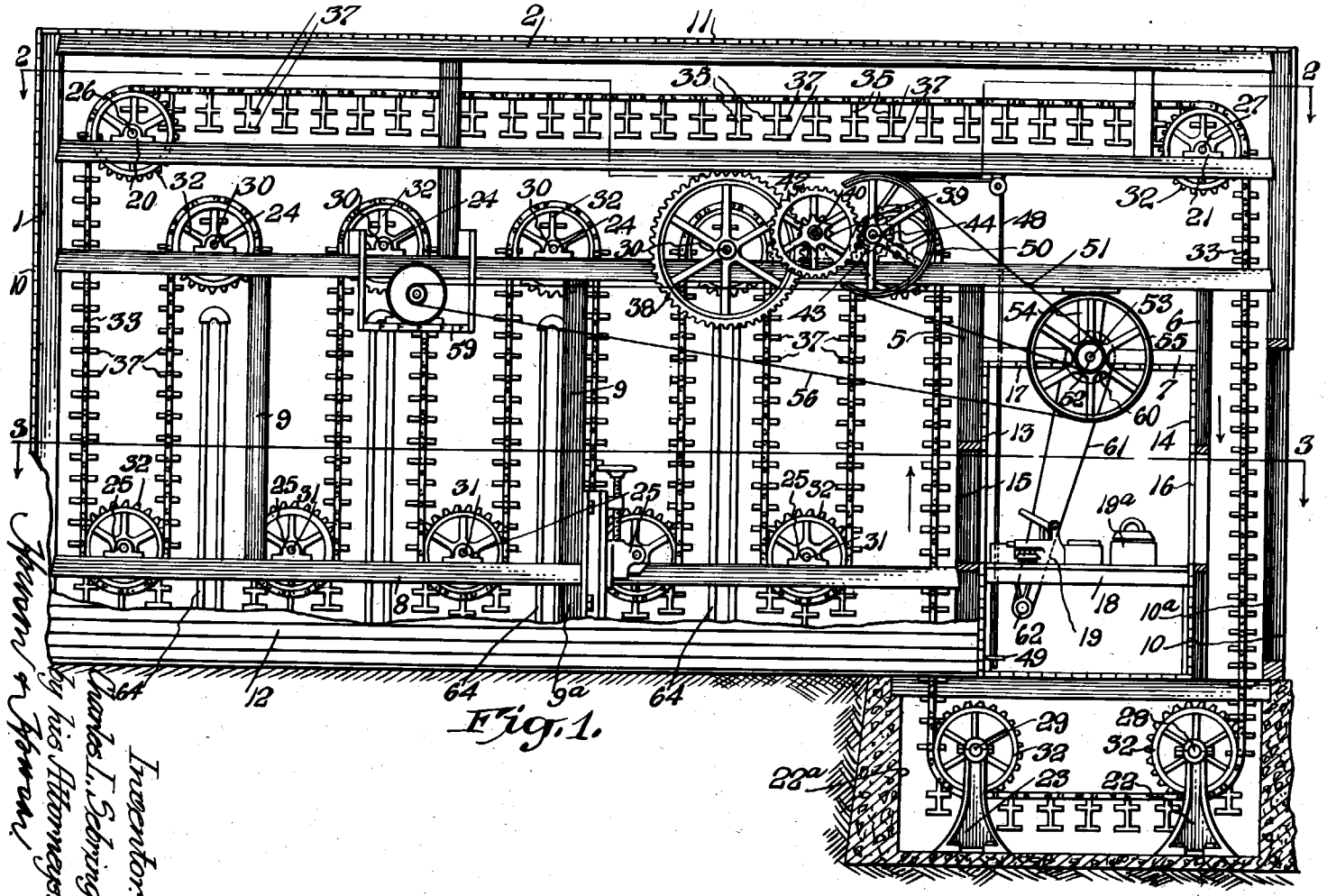
Figure 1 is a side elevation of a drying rack embodying the invention, the outer wall of the heating chamber being broken away for the purpose of illustration.

The drying rack embodying the present invention is an improvement of my former Patent No. 1,294,958 patented February 18, 1919. In said former patent the molds containing the green ware were placed upon an endless conveyor by the jigger operator and carried by said conveyor through a drying chamber, being removed at the opposite end of the device from the jigger operator by the finisher. It was then necessary for all of the empty molds to be carried from this point back to the other end of the device in order that the jigger operator might again use these molds.

In the present invention the jigger operator and his machine are located at the filling point of the endless conveyor and his assistant is located in proper position to keep him supplied with new molds, the endless conveyor passing back through the drying chamber to a point adjacent to the "batter-out" and the "finisher" for the purpose of allowing the "finisher" to easily and readily remove the molds containing the dried ware from the conveyor and after removing the dried ware from said molds, the same molds are replaced upon the shelves of the conveyor where they may be removed by the batter-out who bats out a lump of clay and then turns the molds to the jigger operator.

The frame-work of the device comprises the corner uprights 1 connected at their upper extremities by the horizontal members 2 and at spaced points near the upper portions with the horizontal members 3 and 4. Uprights 5 and 6 support the horizontal members 4 near one end of the device, short horizontal members 7 being supported between said uprights near their upper portions. Horizontal members 8 are supported between the uprights 1 and 5 near their lower ends and uprights 9 may be provided between the members 4 and 8. A short upright 9[a] may be placed beneath the central portion of each horizontal member 8 for the purpose of bracing the structure. End walls 10, a top wall 11 and side-walls 12, of metal sheeting, tongue and groove boards or the like are attached to the framework thus formed, to enclose the drying rack, the side walls being cut away between the uprights 5 and 6 to the height of the horizontal members 7. Similar walls 13 and 14 are provided across the uprights 5 and 6 respectively, said walls being provided with openings 15 and 16 respectively by means of which access may be had to the heating chamber thus formed. A wall 17 is also provided extending between the horizontal members 7.

An open ended compartment is thus formed through one end portion of the device between the uprights 5 and 6 and beneath the horizontal members 7, said compartment being cut off from the heating chamber, access being had to the heating chamber from said compartment only through the openings 15 and 16. A bench or table 18 is located in the compartment thus formed and the jigger 19 is mounted upon said table in such position that the operator thereof may remove the molds containing the green ware from said jigger and pass them through the opening 15, placing them upon the shelves of the endless conveyor which will later be described.

An opening 10[a] is formed in the end wall 10, adjacent to the compartment above described, for the purpose of allowing the finisher to have access to the endless conveyor. The finisher occupies a position adjacent to the finishing table 18[a], which enables him to remove the molds, containing the dried ware, which have passed through the heating chamber, from the endless conveyor, through the opening 10[a], and after removing the dried ware from said molds, the molds are replaced upon the shelves of the endless conveyor from which they were removed.

The dried ware which is thus removed by the finisher is finished in the usual manner and placed upon a board or shelf 18[c] located upon the finished table. As each of these boards or shelves is filled with ware it is placed upon the rack 18[d].

The batter-out occupies a position adjacent to the batter 19[a], which enables him to remove the empty molds from the conveyor through the opening 16 and after batting out a lump of clay, each mold is returned to the jigger operator who forms a new piece of green ware therein and replaces it upon the conveyor, through the opening 15.

It will thus be seen that one set of molds may be used continuously in the device, the molds containing the dried ware being delivered by the conveyor from the drying chamber to a point where they may be conveniently removed to be placed back in the drying chamber.

Mounted upon the horizontal members 3 are the bearings 20—20 and 21—21, which are located near opposite ends of said members; a pair bearings 22 are located within the pit 22[a], said bearings being directly beneath the bearings 21, and a pair of bearings 23 are located within said pit at points spaced from the bearings 22. Spaced pairs of bearings 24 are located at intervals along the length of the horizontal members 4 and similarly spaced pairs of bearings 25 are located at intervals upon the horizontal members 8 being staggered with relation to the bearings 24.

Figure 4:
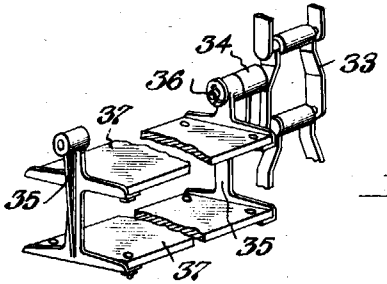
Fig. 4 is a fragmentary perspective view of one of the shelf hangers and a portion of the sprocket chain, an intermediate portion of the shelving being broken away.

Shafts 26 and 27 are journaled in the bearings 20 and 21 respectively, similar shafts 28 and 29 being journaled in the bearings 22 and 23 respectively. The bearings 24 and 25 also have shafts 30 and 31 respectively journaled therein, sprocket wheels 32 being mounted at each extremity of each of said shafts. A pair of endless sprocket chains 33 pass over and engage said sprockets as shown in Fig. 1, and at spaced intervals along the entire length of each of the chains 33 are links provided with bearings 34. Swinging shelf hangers 35 are pivotally connected by means of bolts 36 passing through the bearings 34, and support the shelves 37, all of said construction being clearly illustrated in Fig. 4 of the drawings.

One of the shafts 30 is provided upon one extremity with a gear 38 which meshes with a pinion 39 mounted upon the shaft 40, said shaft being journaled in a suitable bearing 41 mounted on the adjacent horizontal member 4. A gear 42 is also fixed upon the shaft 40 and meshes with the pinion 43 loosely mounted upon the shaft 44, said shaft being journaled through a suitable bearing 45 carried upon the adjacent member 4. A clutch 46 is mounted upon the shaft 44 and arranged to be operated through the lever 47, flexible member 48 and pedal 49 to cause the pinion 43 to rotate with the shaft 44.

A pulley 50 is fixed upon the shaft 44 and connected by means of a belt 51 with a smaller pulley 52 mounted upon the shaft 53, which shaft is journaled in suitable shaft hangers 54 supported upon the under sides of the members 4. A larger pulley 55 is fixed upon the shaft 53 and is connected by means of a belt 56 with the pulley 57 mounted upon the shaft of the motor 58, said motor being preferably mounted upon a shelf 59 supported from the adjacent member 4. A pulley 60 may be provided upon the shaft 53 and connected by means of a belt 61 with a pulley 62 through which the jigger 19 may be operated.

The operation of the device is as follows: The jigger operator and the batter-out are located as above described in their respective positions adjacent to the bench 18, the jigger operator being of course located at the left in position to operate the jigger, while the batter-out is located at the right in suitable position to remove the molds from the endless conveyor through the opening 16. The batter-out places a bat of clay in each mold before handing the same to the jigger operator, who forms ware upon each mold and places the molds upon the shelving exposed through the opening 15. As the shelving exposed through the opening 15 is filled with molds carrying green ware, the jigger operator depresses the pedal 49 for a sufficient length of time to move the conveyor forwardly through the heating chamber in the direction of the arrows shown in Fig. 1, a sufficient distance to bring a new portion of empty shelving into position adjacent to the opening 15. It will of course be understood that the depression of the pedal 49 throws in the clutch 46 coupling the pinion 43 to the shaft 44, and through the chain of gearing above described, rotating the shaft 30 upon which the gear 38 is mounted which in turn causes the sprocket chains to move over the sprockets as above described.

The finisher removes the molds containing the dried ware from the shelves exposed through the opening 10ª taking the dried ware from the molds and replacing the molds upon the shelves. The batter-out then removes the empty molds from the shelves of the conveyor through the opening 16 and places a bat in each mold, after which he hands the mold to the jigger operator to be again used in forming new ware, the jigger operator forming a piece of new ware in each mold and placing the mold upon the shelves of the conveyor through the opening 15. It will of course be evident that as the endless conveyor is moved forwardly through the device by the jigger operator in order to bring empty shelves into position where he can fill them through the opening 15, that the shelves containing the dried ware which have passed entirely through the device will be successively exposed through the openings 10ª and 16. From the foregoing description and accompanying drawings, it will be evident that a drying rack is provided in which the molds carrying the green ware are slowly moved through a heating chamber and around heating elements such as the coils of steam pipe 64, the molds, after passing entirely through the heating chamber, being brought back to a delivery point adjacent to the filling point in order that the jigger operator, batter-out and finisher may conveniently handle the entire operation of the device, only one set of molds being necessary, the same molds being continuously used in the operation of the device.

Figure 2:
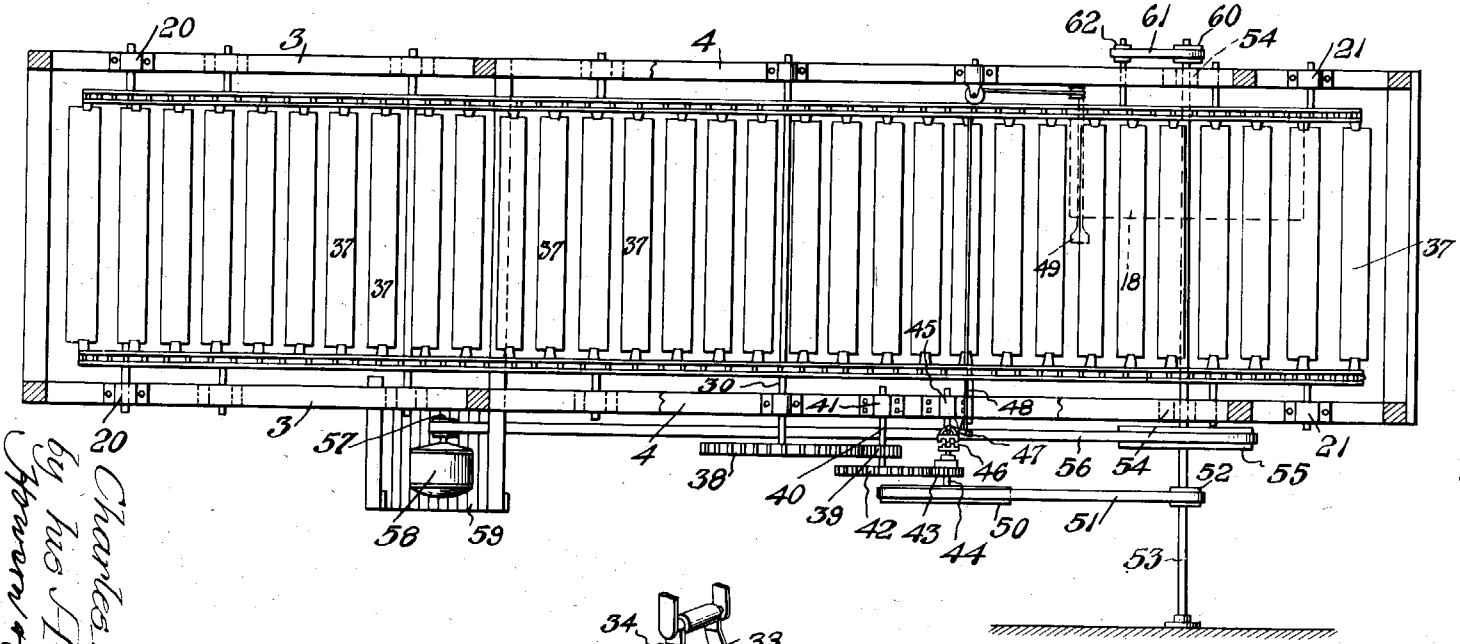
Fig. 2 is a section on the line 2—2, Fig. 1.
Figure 3:
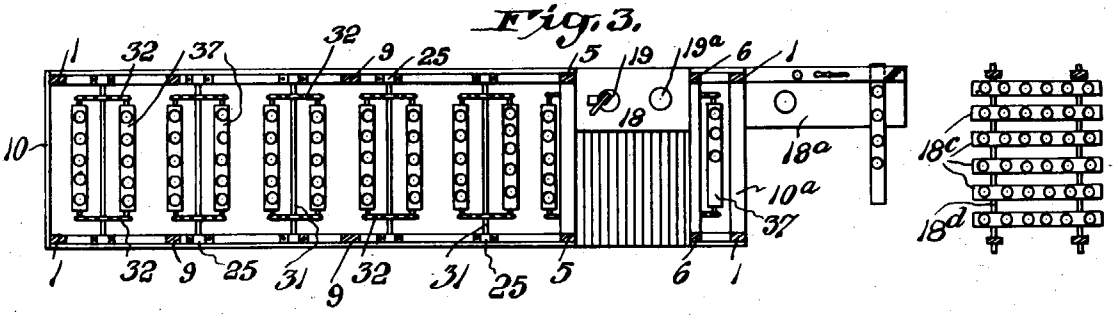
Fig. 3 is a section on the line 3—3, Fig. 1.
Figure 5:
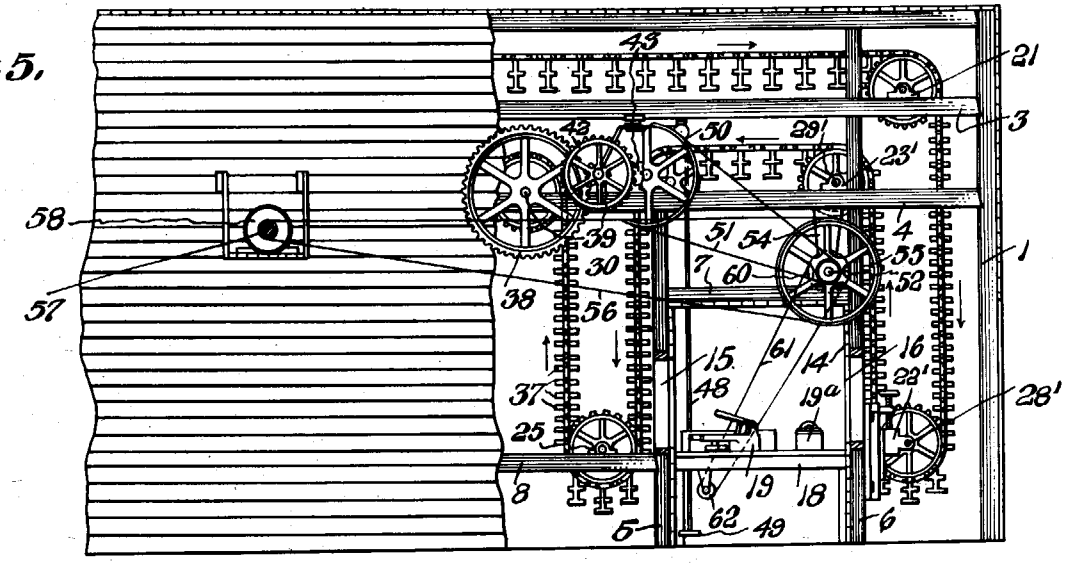
Fig. 5 is a side elevation of a portion of a modified form of drying rack, parts being broken away for the purpose of illustration.

In the slightly modified form of the device illustrated in Fig. 5, a pair of adjustable bearings 22′ are located upon the uprights 6 near the lower ends thereof and directly beneath the bearings 21, and a pair of bearings 23′ are located upon the horizontal members 4 at points adjacent to the upper extremities of the uprights 6, said bearings having shafts 28′ and 29′ respectively journaled therein. The remaining portions of the device are constructed similar to the device illustrated in Figs. 1 to 3 inclusive; the direction of the conveyor chain, however, as it passes the batter-out and jigger operator being the reverse of that shown in Fig. 1.

I claim:

1. In a drying rack and conveyor of the character described, a drying chamber and a conveyor mounted within said drying chamber and arranged to be moved in a circuitous course therein, said drying chamber having adjacent openings for filling and emptying the conveyor.

2. In a drying rack and conveyor of the character described, a drying chamber, a compartment formed near one end of said drying chamber and provided with openings on opposite sides into the drying chamber and a conveyor movable through a circuitous course within said drying chamber and around said compartment.

3. In a drying rack and conveyor of the character described, a drying chamber, a compartment formed near one end of the drying chamber and provided with openings on opposite sides into the drying chamber, the adjacent end of the drying chamber being provided with an opening and a conveyor movable through a circuitous course within the drying chamber and around the compartment, said conveyor moving adjacent to all of said openings.

4. In a dryer of the type described, a drying chamber, an endless conveyor adapted for circuitous travel therethrough, two adjacent vertical runs of said conveyor being spaced apart to allow operators to be located in the space to receive molds from one run and to replace the same with articles to be dried on the other run.

5. In a drying machine of the type described, an endless conveyor adapted to carry articles for subjection to the drying medium, two adjacent runs of said conveyor being spaced apart, with provision intermediate said runs whereby the operations of feeding-in, forming, and removing the articles treated are intimately associated.

6. In a dryer of the type described, a drying chamber, an endless conveyor for carrying articles under treatment, two adjacent runs of said conveyor being spaced apart to serve as receiving and delivery runs, with provision intermediate said runs for the forming of the articles to be dried, whereby the operations of removing the empty molds, forming the articles to be dried, placing them upon the molds, and feeding-in may be performed by operators located within the space between the aforesaid adjacent runs.

7. In a dryer of the type described, a drying chamber and an endless conveyor for carrying articles under treatment, two adjacent vertical runs of said conveyor being spaced apart to serve as receiving and delivery runs and to furnish room for operators therebetween, said delivery run being accessible to operators on both sides thereof, whereby the forming, feeding, delivering and finishing operations can all be effected in close juxtaposition.

8. In a dryer of the type described, a drying chamber, an endless conveyor for carrying articles in said chamber to be dried, said conveyor having a vertical run adjacent one end of the dryer to serve as a receiving run, and another vertical run at the same end of the machine to serve as a delivery run, said delivery run being in advance of the receiving run and spaced therefrom to furnish room for the location of operators between said runs.

9. In a drying machine, including an enclosure, and an endles conveyor, means affording support for the conveyor adjacent to one end of the machine to establish an interval of travel for the conveyor in substantially advanced parallelism with the feeding-in run, whereby the loading and unloading can be effected in close juxtaposition.

CHARLES L. SEBRING.